United States Patent Office 3,517,176

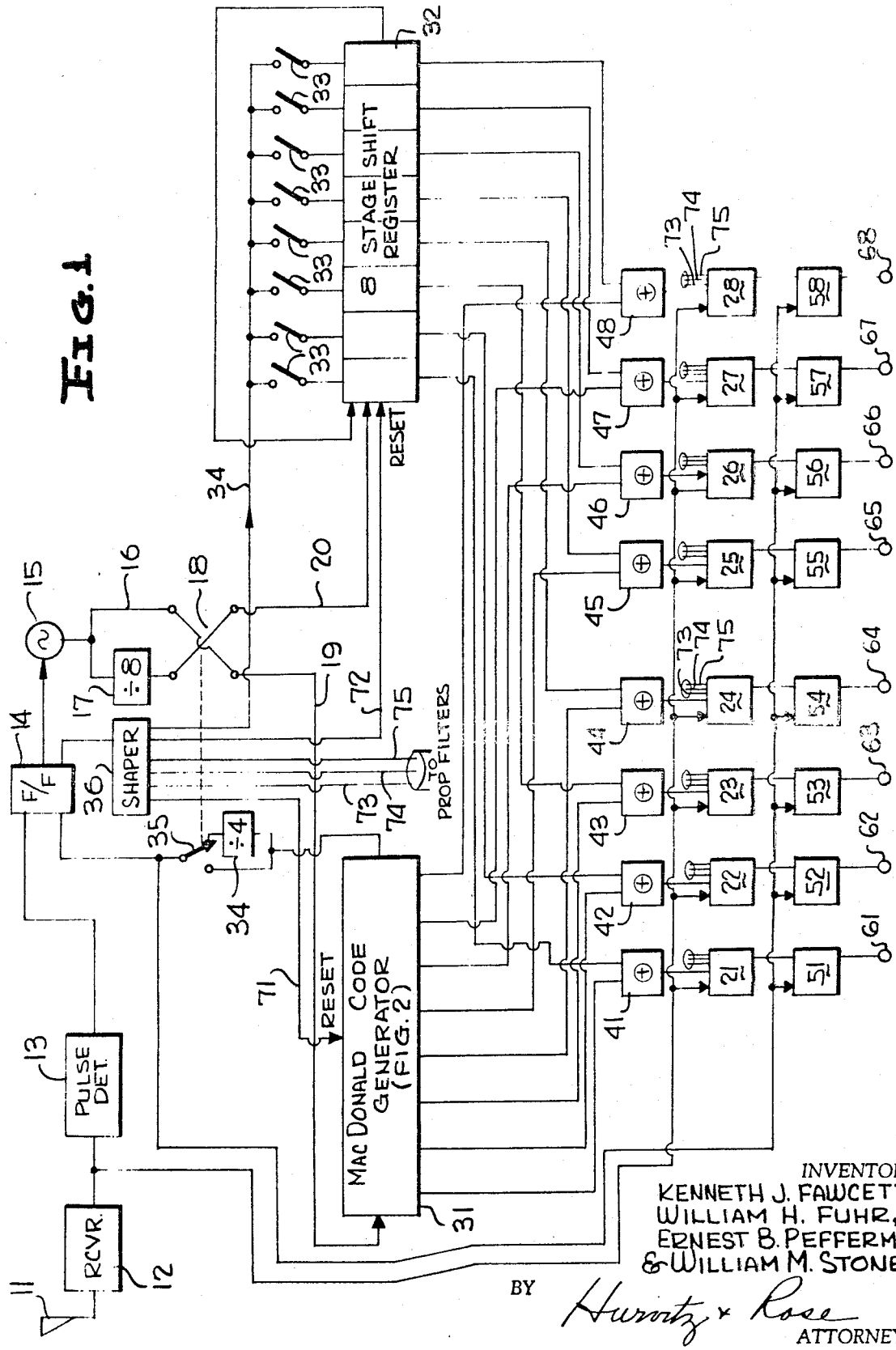

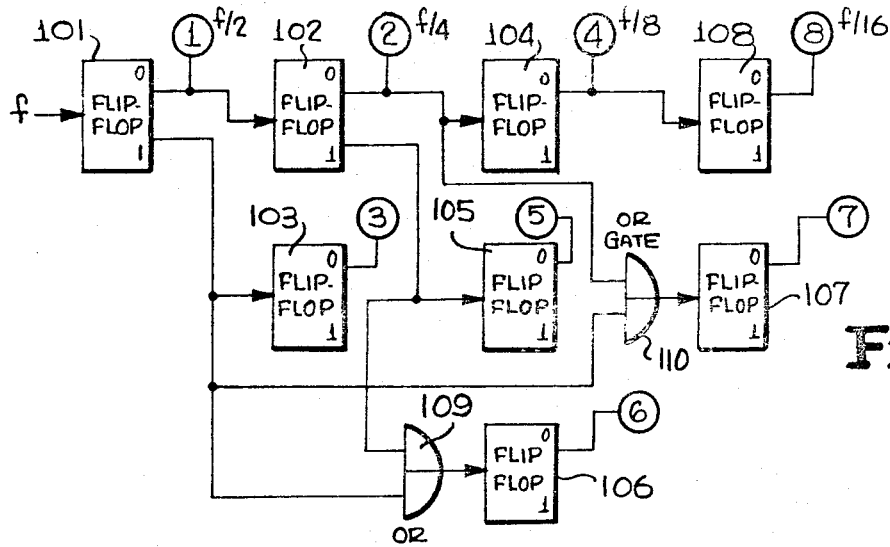
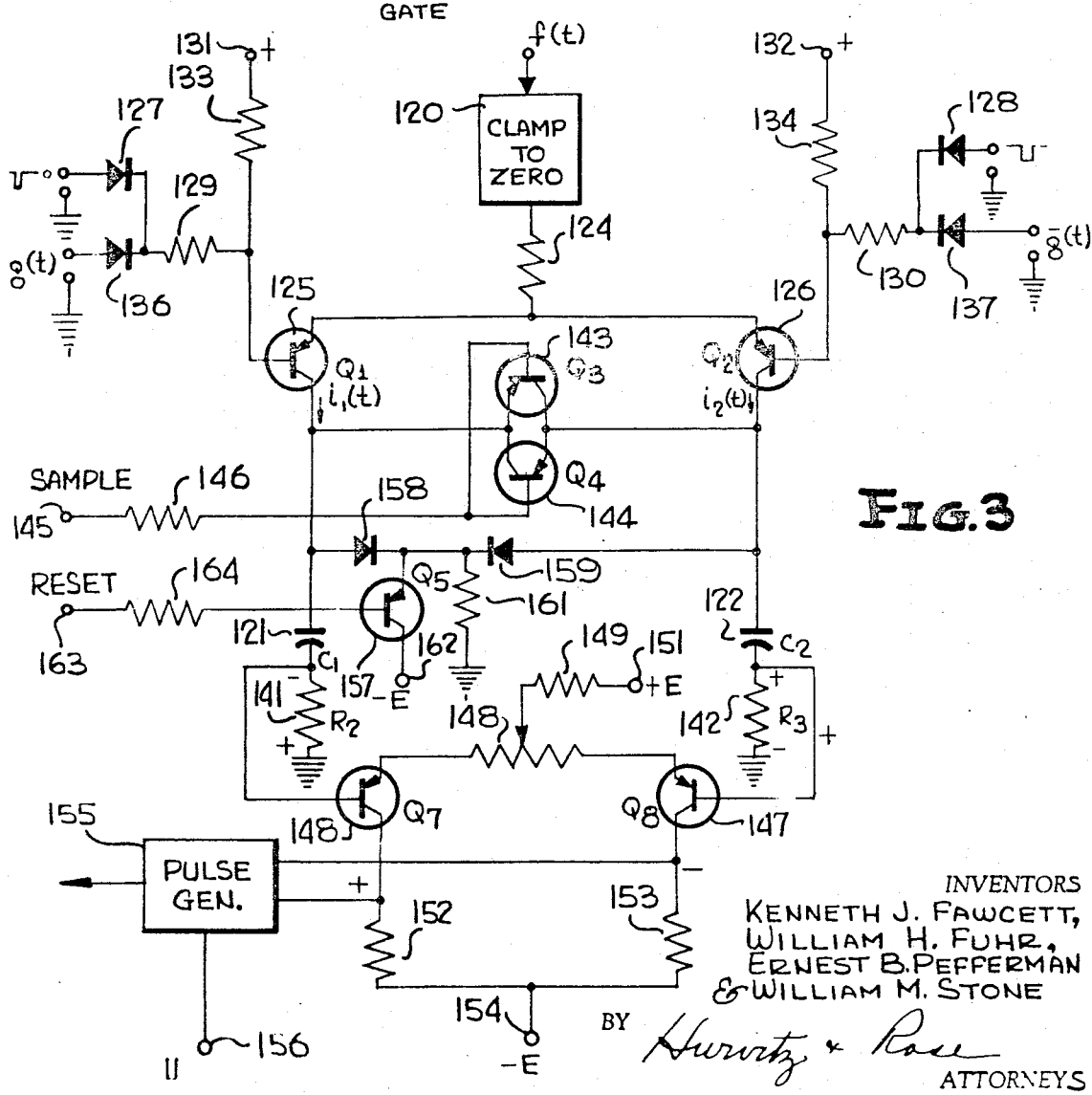

Patented June 23, 1970

3,517,176
ADAPTIVE PULSE ANALYZER WITH CROSS-CORRELATION
Kenneth J. Fawcett, Jr., Falls Church, William H. Fuhr, Springfield, Ernest B. Pefferman, Arlington, and William M. Stone, Herndon, Va., assignors to Melpar, Inc., Falls Church, Va., a corporation of Delaware
Filed Jan. 20, 1964, Ser. No. 338,875
Int. Cl. G06f 15/34
U.S. Cl. 235—181   13 Claims

ABSTRACT OF THE DISCLOSURE

A system for analyzing signals in terms of abstract properties by selective passage of each incoming signal through a set of property filters adaptive to vary their transfer functions according to alteration of digital gating waveforms for the filters. The responses of the filters to the incoming signal are maintained mutually independent by use of orthonormal digital gating waveforms.

---

The present invention relates generally to signal identification and more particularly to a system wherein time varying waveforms are cross correlated with a plurality of different, sequenced, pseudo random wavetrains.

In the increasingly dense signal environments encountered during a typical radar identification situation, it frequently occurs that the number of signals in a particular area to which a receiver is responsive exceeds the capabilities of existing identification apparatus. While a number of solutions to the problem have been advanced, none have completely solved the problem. If the receiver is effectively able to separate signals from various radars having similar characteristics, its acquisition level is usually excessively high so only strong signals are processed. For receiver systems having low acquisition levels, it has generally been found that insufficient information is available to classify and separate the signals. Because signals from the various radar sources are interleaved, i.e. pulses from one radar occur between a pair of pulses from a second radar, the problem is further aggravated by the low gain receiver usually required for the large frequency range that must be covered.

According to the present invention, classification of interleaved pulses from separate radars is accomplished by cross correlating the time varying waveforms with a plurality of different, pseudo random, binary sequences. Each correlation with a particular waveform results in a plurality of indications that are used to identify the separate signals. For pulses of differing wave shapes, different indications are usually derived. If, however, differing waveshapes cause identical indications to be derived, the pseudorandom wavetrains are easily changed until differing indications are provided.

In essence, the invention resides in a system for classification, analyzation, and/or identification of signals in terms of abstract, as opposed to rational, properties of the signals; and wherein information relating to abstract properties of the signals is extracted therefrom by adaptive property filters. In accordance with an embodiment of the invention, a set of property filters whose transfer functions may be selectively altered according to the particular format of applied binary wavetrains, are coupled for parallel receipt of incoming signal to be analyzed and for receipt of a set of respective orthonormal binary wavetrains. The filters respond to the signal to produce bit values as will be described in detail presently. As is well known, orthonormal waveforms are orthogonal functions (i.e., the integral of the product of the several functions vanishes over specified limits of integration) which are normalized for zero bias, for example. In the case of binary waveforms, orthonormality is indicative of mutual independence and of possession of same proportion of "ones" as "zeros." In order to provide meaningful classification, the responses of the plurality of filters should be mutually independent; that is, the response (output) of any one filter should have equal likelihood of being either binary value without regard to the response of any other filter at that time. Application of different ones of a set of orthonormal binary wavetrains to respective ones of the filters insures this mutually independent response. In addition, each filter yields a response to a forcing function (input signal) depending upon its particular transfer function. By selectively altering each binary wavetrain without destroying orthonormality of the set of wavetrains, the transfer function of the property filter to which the altered waveform is applied may be varied, i.e. the filter is rendered adaptive, without disturbing the independence of response. This is achieved in accordance with an embodiment of the present invention by an exclusive-OR combination of a pseudo-random binary sequence, i.e., a sequence having statistical properties approximating those of a random sequence, with the orthonormal binary codes to produce further orthonormal binary codes in the form of wavetrains whose bit sequences are selectively alterable.

To derive the pseudo random wavetrains, plural orthonormal sequential binary wavetrains, i.e. trains which are completely independent of each other, are generated by a MacDonald code generator. These trains are combined with plural pseudo random signals deriving from a feedback shift register in separate half adder circuits. The feedback register states are selectively preloaded with binary ones so the signals deriving from the half adders can be varied at will in response to loading changes of the register.

To further increase the number of separate wavetrains that can be derived from the half adders, the relative frequencies at which the code generator and shift register are advanced may be varied. Under one mode of operation, the code generator is advanced through a complete operating cycle while the shift register remains in a fixed state. When the shift register is advanced to its next state, the code generator cycle is repeated. This process is repeated until all combinations of the shift register and code generator have been processed. In the second mode, the relative frequencies at which the code generator and shift register are advanced is reversed from the first mode, whereby the shift register goes through a complete cycle while the code generator remains fixed.

It is accordingly an object of the present invention to provide a new and improved system for identifying waveforms, particularly interleaved waveforms of the type detected by radar identification receivers.

Another object of the invention is to provide a waveform identifying receiver system wherein plural pseudo random wavetrains are cross correlated with the received wave.

A further object of the invention is to provide a receiver system wherein an extremely large number of pseudo random signals can be generated at will to aid in the identification of differing wavetrains.

An additional object of the invention is to provide a new and improved system having a low acquisition level for effectively identifying from which sources interleaved radar pulses emanate.

A still further object of the invention is to provide a new and improved means of generating orthonormal codes.

Yet another object is to provide a new and improved code generator for generating plural, pseudo random, orthonormal signals.

The above and still further objects, features and advantages of the present invention will become apparent upon consideration of the following detailed description of one specific embodiment thereof, especially when taken in conjunction with the accompanying drawings, wherein:

FIG. 1 is a system block diagram of a preferred embodiment of the invention;

FIG. 2 is a circuit diagram of the code generator utilized in FIG. 1; and

FIG. 3 is a circuit diagram of one of the property filters illustrated in FIG. 1.

Reference is now made to FIG. 1 of the drawings wherein antenna 11 is responsive to pulses of R.F. carrier frequency, such as are derived from radar systems. Each radar has a pulse envelope characteristic that differs from other radars and even varies as a function of time. To detect the envelope of these pulses, the antenna is coupled to the input of radar receiver 12, the output of which is applied in parallel to property filters 21–28 and pulse detector 13. In response to the envelope deriving from receiver 12, detector 13 generates a pulse to set bistable flip flop 14. With flip flop 14 so activated, clock source 15 is turned on and remains on until the flip flop is reset after 64 clock pulses have been generated.

The clock pulses at frequency F deriving from oscillator 15 are applied with frequencies F or $F/8$ to advance the states of eight output MacDonald code generator 31 and eight stage feedback shift register 32 via one eighth frequency divider 17 and reversing switch 18. Shift register 32 is of the conventional feedback type wherein the output of the last stage is coupled back to the first stage to supply the first stage with a binary one when the last stage is leaving the binary one state. In addition, a selected stage or stages of shift register 32 are supplied with binary one inputs prior to the initiation of each group of 64 clock pulses via manually operated switches 33, one of which is provided for each shift register stage. Thus for each combination of switches 33, there is derived from each state of shift register 32, a different sequential pseudo random series of binary pulses.

The different binary signals deriving from each of the eight outputs of MacDonald code generator 31 in response to the sequential application thereto of sixteen pulses from oscillator 15 are in accordance with Table I.

TABLE I

| Number of outputs | Number of pulses from clock 15 | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 1 | 0 | 1 | 0 | 1 | 0 | 1 | 0 | 1 | 0 | 1 | 0 | 1 | 0 | 1 | 0 | 1 |
| 2 | 0 | 0 | 1 | 1 | 0 | 0 | 1 | 1 | 0 | 0 | 1 | 1 | 0 | 0 | 1 | 1 |
| 3 | 0 | 1 | 1 | 0 | 0 | 1 | 1 | 0 | 0 | 1 | 1 | 0 | 0 | 1 | 1 | 0 |
| 4 | 0 | 0 | 0 | 0 | 1 | 1 | 1 | 1 | 0 | 0 | 0 | 0 | 1 | 1 | 1 | 1 |
| 5 | 0 | 0 | 1 | 1 | 1 | 1 | 0 | 0 | 0 | 0 | 1 | 1 | 1 | 1 | 0 | 0 |
| 6 | 0 | 1 | 0 | 1 | 1 | 0 | 1 | 0 | 0 | 1 | 0 | 1 | 1 | 0 | 1 | 0 |
| 7 | 0 | 1 | 1 | 0 | 1 | 0 | 0 | 1 | 0 | 1 | 1 | 0 | 1 | 0 | 0 | 1 |
| 8 | 0 | 0 | 0 | 0 | 0 | 0 | 0 | 1 | 1 | 1 | 1 | 1 | 1 | 1 | 1 | 1 |

After the sixteenth pulse, the cycle repeats itself for a total of 64 pulses. It is to be noted that each of these sequences (one through eight) has zero polarity bias over the complete duration of sixteen clock pulses, i.e. the number of binary zeros and ones is equal. Further, the eight sequences are independent of each other, i.e. the half sum of any two sequences is an unbiased sequence, a characteristic termed "orthogonal." Each sequence defines a bipolar constant amplitude wavetrain. The eight wavetrains so defined comprise an orthonormal set.

A further characteristic of the MacDonald code is that the eighth output occurs at a frequency one sixteenth that of clock 15 ($F/16$) and that four complete sequences thereof occur during sixty four clock pulses. Hence, to determine when sixty four clock pulses have occurred it is merely necessary to supply the eighth output of generator 31 through one quarter frequency divider 34 and switch 35 to the reset input of flip flop 14. When divider 34 is so activated, the enabling voltage for oscillator 15 from flip flop 14 ceases which terminates the generation of clock pulses. As oscillator 15 is deactivated, the reset output of flip flop 14 supplies a voltage to shaper 36 that derives five separate control voltages, the purposes of which are more clearly seen infra. Oscillator 15 remains deenergized until another pulse is generated by detector 13, at which time 64 more pulses are derived from the oscillator.

With the apparatus thus far described, there are $2^8 = 256$ different signal combinations of generator 31 and shift register 32 because there are eight different manually operated switches 33 for preloading shift register 32. To increase the number of combinations twofold to 512, the states of generator 31 and shift register 32 are respectively advanced at frequencies $F/8$ and $F$ instead of at frequencies $F$ and $F/8$, by reversing the position of switch 18. In this position of switch 18, shift register 32 advances through all eight of its stages while generator 31 stays in one of its states; in the other position the converse is true. With switch 18 in the reversed position from that illustrated, 64 clock pulses are necessary to advance the eighth output of generator 31 from a binary zero to a binary one. In consequence, the position of switch 35, ganged to switch 18, is changed so divider 34 is bypassed and the eighth output of generator 31 is applied directly to reset flip flop 14 after 64 clock pulses have been generated. Thereby, the total period oscillator 15 remains activated for both positions of switch 18 is identical.

The binary outputs of associated stages of generator 31 and shift register 32 are combined in half adders 41–48 to derive eight pseudo random binary signals, each having a 64 bit length. The half adders are of the usual type wherein a binary zero is generated when the two binary inputs thereto are identical and a binary one is generated when the inputs are different.

Each of the binary signals deriving from half adders 41–48 is applied to a separate one of the property filters 21–28 where it is combined with the detected envelope from receiver 12 in accordance with $$eo_n = \int_0^T f(t) g_n(t) dt \quad (1)$$

where:

$eo_n$ = the binary value of the $n$th property filter;
$f(t)$ = the time representation of the detected waveform;
$g_n(t)$ = the sequence deriving from the $n$th half adder; and
$T$ = the time over which the complete sequence from the $n$th half adder is applied to the $n$th property filter, i.e. 64 clock pulses.

Equation 1 implies that the binary value deriving from the $n$th filter after T seconds is a binary one ($eo_n=1$) if the sum of the values of $f(t)$ when $g(t)$ is a binary one exceeds the sum of the values of $f(t)$ when $g(t)$ is a binary zero. For all other situations $eo_n=0$. Each property filter thus cross correlates the pseudo random, orthonormal signal applied to it with the detected waveshape of the received radar pulses. For different radar transmitters, different correlations from the various property filters are derived so that it is possible to identify various radars by observing the binary responses of the property filters.

To sample the binary values of the signals deriving from filters 21–28, flip flops 51–58 are provided. Each of the flip flops 51–58 is activated to its reset state in response to the signal on switch 35 as oscillator 15 is being turned off. Only those flip flops connected to property filters that generate binary ones are thereafter activated to the set state wherein lamps 61–68 are energized. Hence, the lamps provide a visual indication regarding the nature of the received waveforms.

Upon reception by wide bandwith receiver 12 of an R.F. pulse, detector 13 generates a signal that sets flip flop 14 so as to turn on oscillator 15. After 64 pulses have been generated, the voltage on switch armature 35 causes flip flop 14 to be reset and shaper 36 to be energized. Energization of shaper 36 causes voltages to be generated on leads 71 and 72 to reset generator 31 and shift register 32 back to their initial states. The preselected stages of shift register 32 are loaded with binary ones by the voltages applied thereto from shaper 36 via lead 34 and switches 33.

Upon deactivation or resetting of flip flop 14, shaper 36 immediately generates a short duration pulse on lead 73 that is applied to each of property filters 21–28 in parallel. This pulse causes the value $eo_n$ stored in the $n$th property filter to be sampled and applied to the $n$th input of flip flops 51–58, where $n = 1, 2, 3 \ldots 8$.

After the stored values in property filters 21–28 have been supplied to flip flops 51–58, a further pulse is generated by shaper 36 on lead 74. This pulse on lead 74 is applied in parallel to property filters 21–28 to reset the stored value therein to a zero, quiescent value in preparation for the next received pulse.

To prevent the erroneous accumulation of energy on the storage capacitors of filters 21–28 in the interval when no binary output is derived from half adders 41–48, circuit 36 applies a blocking voltage on lead 75 to each of the filters. The blocking voltages on lead 75, as well as the loading and reset voltages on leads 37, 71 and 72 are generated until flip flop 14 is activated back to its set condition by detector 13, at which time a new correlation computing interval is initiated by activating oscillator 15.

To provide a better understanding of the manner in which the present circuit operates, a number of examples will be considered. First, assume that the odd stages of shift register 32 are loaded with binary ones and the even stages are initially loaded with binary ones. Hence, the eight outputs of shift register 32 for the 64 sequential clock pulses deriving from source 15 are in accordance with Table II.

TABLE II

| Number of clock pulses from oscillator 15 | Number of stage of shift register 32 | | | | | | | |
|---|---|---|---|---|---|---|---|---|
| | 1 | 2 | 3 | 4 | 5 | 6 | 7 | 8 |
| 1–8 | 1 | 0 | 1 | 0 | 1 | 0 | 1 | 0 |
| 9–16 | 0 | 1 | 0 | 1 | 0 | 1 | 0 | 1 |
| 17–24 | 1 | 0 | 1 | 0 | 1 | 0 | 1 | 0 |
| 25–32 | 0 | 1 | 0 | 1 | 0 | 1 | 0 | 1 |
| 33–40 | 1 | 0 | 1 | 0 | 1 | 0 | 1 | 0 |
| 41–48 | 0 | 1 | 0 | 1 | 0 | 1 | 0 | 1 |
| 49–56 | 1 | 0 | 1 | 0 | 1 | 0 | 1 | 0 |
| 57–64 | 0 | 1 | 0 | 1 | 0 | 1 | 0 | 1 |

This pseudo random set of binary waves when combined with the orthogonal sequences deriving from code generator 31 in half adders 41–48 results in the orthogonal sequences shown in Table III being generated for the first sixteen clock pulses.

TABLE III

| Number of half adder | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 41 | 1 | 0 | 1 | 0 | 1 | 0 | 1 | 0 | 0 | 1 | 0 | 1 | 0 | 1 | 0 | 1 |
| 42 | 0 | 0 | 1 | 1 | 0 | 0 | 1 | 1 | 1 | 1 | 0 | 0 | 1 | 1 | 0 | 0 |
| 43 | 1 | 0 | 0 | 1 | 1 | 0 | 0 | 1 | 0 | 1 | 1 | 0 | 0 | 1 | 1 | 0 |
| 44 | 0 | 0 | 0 | 0 | 1 | 1 | 1 | 1 | 1 | 1 | 1 | 1 | 0 | 0 | 0 | 0 |
| 45 | 1 | 1 | 0 | 0 | 0 | 0 | 1 | 1 | 0 | 0 | 1 | 1 | 1 | 1 | 0 | 0 |
| 46 | 0 | 1 | 0 | 1 | 1 | 0 | 1 | 0 | 0 | 1 | 0 | 1 | 1 | 0 | 0 | 1 |
| 47 | 1 | 0 | 0 | 1 | 0 | 1 | 1 | 0 | 0 | 1 | 1 | 0 | 1 | 0 | 0 | 1 |
| 48 | 0 | 0 | 0 | 0 | 0 | 0 | 0 | 0 | 0 | 0 | 0 | 0 | 0 | 0 | 0 | 0 |

Because the signals deriving from generator 31 and shift register 32 repeat in exactly the same phases after the sixteenth clock pulse as for the first sixteen clock pulses, the signals from half adders 41–48 also repeat after the sixteenth clock. An observation of Table III reveals that each sequential output of half adders 41–48 is pseudo random, orthogonal and, with the exception of the last filter output, unbiased.

The binary time varying values generated by half adders 41–48 are separately multipled with the received time varying pulse envelope deriving from receiver 12 in property filters 21–28. These multiplied values are accumulated by the filters from each of which is derived a binary zero or one at the end of 64 clock pulses.

In operation, pulses from a "friendly" radar are initially supplied to antenna 11 and the response of indicator lamps 61–68 is noted with a particular setting combination of switches 33. The operator is thus provided with a light pattern indicative of the "friendly" radar. When an "enemy" radar emits pulses received by antenna 11, the pulse waveshape is different than that of the "friendly" radar so that correlation of the "enemy" waveshape with the code deriving from half adders 41–48 is usually different for at least one of the property filters 21–28. Because of the difference in correlations, the different lamps are activated to provide the operator with an indication that an unknown or enemy radar is emitting energy that is being detected by the receiver.

If the "enemy" pulse, which usually is interleaved between friendly pulses, has a waveform that causes the outputs from filters 21–28 to be identical to that derived in response to the friendly radar, the filter response can be varied by changing the positions for some of switches 33. This causes a different code to be generated by all of the half adders 41–48 so that $g_n(t)$ in Equation 1 changes. By changing $g_n(t)$, the response of each filter, there is a good probability that a different set of indicator lamps will be activated for the "enemy" radar than for the "friendly" radar.

Reference is now made to FIG. 2 of the drawings wherein the construction of MacDonald code generator 31 of FIG. 1 is illustrated. Generator 31 includes eight bistable flip-flops 101–108 interconnected with OR gates 109 and 110 to provide the code given by Table I.

Each flip flop includes a pair of outputs, termed "0" and "1." When a positive going input is applied to a particular flip flop, it changes state from a zero to one or vice versa. A negative going input has no effect on the flip flop status.

When a flip flop is in the binary one state, the voltage on the "0" output is low while the voltage on the "1" output is concurrently large and positive. When the flip flop changes to the binary zero state, the voltage on the "0" output goes positive by a large amount while the "1" output goes to its low value.

In operation, flip flops 101, 102, 104, 107 and 108, from which the first, second, fourth, seventh and eighth outputs of code generator 31 are derived, are initially set to binary one states. At the same time, flip flops 103, 105 and 106 for the third, fifth and sixth coded outputs, are set to binary zero states. The outputs of the code generator are all derived from the "0" output of the flip flop associated with the particular number. Setting of flip flops 101–108 is accomplished by the voltage on lead 71 that is applied to the appropriate flip flop stages prior to application of the first clock pulse to flip flop 101.

In response to the first clock pulse applied by oscillator 15 to the input of flip flop 101, that flip flop changes state from a binary one to a binary zero. As a result the "1" output of flip flop 101 goes negative and the "0" output goes positive. This causes flip flop 102 to change state from one to zero with similar voltage changes on its output leads. Because the "0" output of flip flop 102 goes positive, the state or flip flop 104 changes to a zero value. Changing flip flop 104 to a zero value causes a positive going voltage to be applied to the input of flip flop 108 with a resultant change in its state from one to zero. The positive going voltage deriving from the "0" output of flip flop 102 is also supplied through OR gate 110 to the input of flip flop 107 to change the state of that flip flop to a zero. It is thus seen that the states of flip flops 101, 102, 104, 107 and 108 are changed from their initial, preset one states to zero states in response to the first pulse from clock source 15. The first pulse from source 15 has no effect on flip flops 103, 105 and 106, however. This results from the inputs of these flip flops being connected to the negative going binary "1" outputs of flip flops 101 and/or 102; the "1" output of flip flop 101 being connected to the inputs of flip flops 103 and 106; the "1" output of flip flop 102 being connected to the inputs of flip flops 105 and 106; and both of the inputs to flip flop 106 being via OR gate 109. The "1" output of flip flop 101 is also connected to the input of flip flop 107 via OR gate 110.

In response to the second pulse from source 15, the state of flip flop 101 again changes so it returns to its binary one state. The resulting negative going voltage on the "0" output of flip flop 101 has no effect on the state of flip flop 102 or any of the flip flops connected to the "0" output of flip flop 102. The positive going voltage on the "1" output of flip flop 101, however, changes the states of flip flops 103, 106 and 107 to binary ones. Thereby, flip flops 101–108 are in the states indicated by the second column of Table I after the second clock pulse. The operation of generator 31 continues in a similar manner to that described in connection with the first and second pulses to derive the seqeunces given in Table I.

Reference is now made to FIG. 3 of the drawings, a circuit diagram of a preferred embodiment of one property filter 21–28. Each property filter is responsive to the detected envelope $f(t)$ which is selectively applied to a pair of storage capacitors 121 and 122 from terminal 123 via zero voltage level clamper 120, current controlling resistor 124 and PNP transistors 125, 126, respectively. Transistors 125 and 126 are selectively enabled when oscillator 15 is energized by flip flop 14 in response to the negative voltage applied to the anodes of diodes 127 and 128, connected to the respective transistor bases via current limiting resistors 129 and 130. When oscillator 15 is deactivated and $g(t)$, the output of half adders 41–48, is not generated no charge should be applied to capacitors 121 and 122 by $f(t)$. Hence, transistors 125 and 126 are cut off during that interval by the zero voltage level clamp applied to the anodes of diodes 127 and 128 from lead 75 and the positive bias coupled from terminals 131 and 132 through resistors 133 and 134. During the calculating interval, however, transistors 125 and 126 are selectively activated in response to the $g(t)$ and $\overline{g(t)}$ pulses applied to their bases by the output of one of half adders 41–48.

When $g(t)$ is a binary one, the half adder output is positive, so diode 136 conducts, and current flows from the base of transistor 125. In consequence, transistor 125 conducts and positive current flows from clamper 120 through the emitter collector path of transistor 125 to capacitor 121.

When $g(t)$ is a binary zero, the anode voltage of diode 136 drops to zero and positive current is applied from terminal 131 to the base of transistor 125, cutting the transistor off. No current path now exists to discharge capacitor 121 so the charge accumulated thereby when $g(t)=1$ is stored.

At the same time that a negative voltage is applied to the anode of diode 136, when $g(t)=0$, a positive voltage is coupled to the anode of diode 137 by $\overline{g(t)}=1$. This causes transistor 126 to conduct when transistor 125 is cut off so capacitors 121 and 122 are charged at different times in response to $f(t)$. It should thus be apparent that the charge accumulated across each of capacitors 121 and 122 after 64 clock pulses have been generated by source 15 is proportional to the length of time $g(t)$ was a binary one during the computing interval and the values of $f(t)$ when $g(t)$ was equal to one, i.e.;

$$\int_0^T f(t)g(t)dt$$

To determine if $$\int_0^T f(t)g(0)dt$$

is greater than $$\int_0^T f(t)g(1)dt$$

i.e. whether the accumulated values of $f(t)$ when $g(t)$ was a binary zero exceeded the accumulated value of $f(t)$ when $g(t)$ was a binary one, the voltages across capacitors 121 and 122 are sampled after the 64th clock pulse has been generated. To accomplish this, a series discharge path is established for capacitors 121 and 122 through low valued current sampling resistors 141 and 142, as well as through back to back PNP transistors 143 and 144. The bases of transistors 143 and 144 are connected in parallel to terminal 145 via current limiting resistor 16. When a negative sampling voltage is applied to terminal 145 via lead 73 after transistors 125 and 126 have been cut off by the clamp applied to diodes 127 and 128, current flows through the discharge path in a direction determined by the charge accumulated by capacitors 121 and 122. If $$\int_0^T f(t)g(1)dt$$

exceeds $$\int_0^T f(t)g(0)dt$$

so the charge, hence voltage, of capacitor 121 exceeds that of capacitor 122, positive current flows from capacitor 121 through transistor 143, capacitor 122, and resistors 142, 141. In response to the current flow the ungrounded ends of resistors 141 and 142 are negative and positive, respectively. If however, greater charge is accumulated by capacitor 122 than by capacitor 121, current flows in the opposite direction, through transistor 144 rather than transistor 143 and the voltages across resistors 141 and 142 are reversed.

To determine the direction of current flow during the sampling interval, hence the binary valve computed by the property filter, the voltages across resistors 141 and 142 are applied to the bases of PNP transistors 146 and 147. Transistors 146 and 147 are connected in a common emitter differential amplifier configuration wherein their emitters are connected to opposite ends of current balancing potentiometer 148, the slider of which is connected via current control resistor 149 to a positive Dc bias at terminal 151. The collectors of transistors 146 and 147 are connected through load resistors 152 and 153 to the negative voltage at terminal 154. The voltages across load resistors 152 and 153 are coupled to pulse generator 155, activated simultaneously with transistors 143 and 144, by a pulse applied to terminal 156 from lead 74 concurrently with the sample pulse at terminal 145.

When the current flow between capacitors 121 and 122 is such that the voltages applied to the bases of transistors 146 and 147 are negative and positive, respectively, transistor 146 is rendered conductive and the transistor 147 is driven towards cut off. In response to this condition, the collector voltages of transistors 146 and 147 go positively and negatively, respectively, causing pulse generator 155 to be activated to produce a binary one output. When the current flow between capacitors 121 and 122 is reversed, transistor 147 conducts heavily while transistor 146 is driven towards cut off so a binary zero is derived from generator 155. If sufficient current is applied to the bases of transistors 146 and 147 during any other portion of the cycle so that a current imbalance exists in the transistors except during sampling, pulse generator 155 is not activated because a disabling voltage is applied thereto via terminal 156 from lead 75.

After the charge stored by capacitors 121 and 122 has been sampled, it is necessary to restore equal charges thereto so erroneous results will not be produced during the next computation cycle. To accomplish this result, transistor 157 is provided. The emitter of transistor 157 is connected to capacitors 121 and 122 via diodes 158 and 159, the cathodes of which are connected to the transistor emitter. Between ground and the emitter of transistor 157 is also connected resistor 161. The base of transistor 157 is connected through current limiting resistor 164 to the negatively biased lead 74 via terminal 163. The collector of transistor 157 is connected to the negative voltage at terminal 162.

In operation, transistor 157 is normally cut off by the positive voltage applied to its base from terminal 163 so no discharge path for capacitors 121 and 122 exists through it. When the sample pulse on terminal 145 ceases, however, transistor 157 is forward biased into heavy conduction by the application of a large negative voltage to terminal 163. This results in equal negative current flow through diodes 158 and 159 to capacitors 121 and 122, whereby the capacitors are both charged to the same extent. In consequence, capacitors 121 and 122 are charged to the same voltage and no initial offsetting bias is introduced thereby into the next computation cycle.

While we have described and illustrated one specific embodiment of our invention, it will be clear that variations of the details of construction which are specifically illustrated and described may be resorted to without departing from the true spirit and scope of the invention as defined in the appended claims.

We claim:
1. A system for analyzing signal in terms of abstract properties thereof, comprising means responsive to incoming signal for selectively extracting therefrom information regarding an abstract property thereof from which to generate a binary word descriptive of said incoming signal during a predetermined time interval; said selective extracting means including means for rendering the generation and value of each bit of said descriptive binary word independent of the generation and value of each of the other bits thereof, and means for selectively altering the information to be extracted from said incoming signal to vary the character of the abstract property to be examined; and means for indicating the binary word generated by said selective extracting means as a characterization of said incoming signal during said time interval.

2. The invention according to claim 1 wherein said selective extracting means comprises a plurality of property filters for transferring incoming signal in accordance with the respective transfer functions thereof, said selective altering means comprising a binary sequence generator having means for selectively setting to either binary value each bit in a sequence to be generated, said independent rendering means comprising an orthonormal binary code generator, means for logically combining the orthonormal binary codes with binary sequences to produce further orthonormal binary codes, said property filters responsive to separate ones of said further orthonormal binary codes to assume respective transfer functions in accordance with the values of bits therein, the alteration of the values of bits in said binary sequences being effective to change said respective transfer functions and thereby the character of the abstract property to be examined.

3. The invention according to claim 2 wherein said binary sequence generator comprises a recirculating multi-storage shift register and wherein said means for selectively setting comprises a plurality of switches coupled to respective ones of the stages of said shift register to permit selective application of voltage representative of one of said binary values to said stages.

4. A signal analyzing system comprising a plurality of filters responsive to signal to be analyzed for measuring an abstract property of said signal by passage thereof in accordance with the respective filter transfer function, means responsive to amount of said signal passed for each filter for generating a respective binary digit having a value dependent upon amount of signal passed during a predetermined time interval relative to a predetermined reference amount, generating means for applying to said filters binary waveforms having formats selected to render the response of each filter to said signal independent of the response of any other filter and having bit values selected to control the transfer function of the respective filter to which each of said waveforms is applied, whereby to selectively alter the abstract property which said filters are capable of measuring during said time interval, and means for displaying said binary digits derived from the signal passed by each filter as a characterization of the signal under analysis.

5. A system for identifying waveforms according to abstract properties thereof, comprising means for generating orthonormal binary sequences, means for generating pseudo-random binary sequences of selectable bit values, means for synchronously combining the outputs of said orthonormal generating means and pseudo-random generating means to produce orthonormal binary wavetrains of at least partially selected bit values, a plurality of adaptive property filters coupled for parallel receipt of a waveform to be identified and responsive to the orthonormal character and selection of bit values of said wavetrains to respectively yield mutually independent responses to said waveform and undergo alteration of respective filter transfer function, said filters for correlating said waveform with respectively applied ones of said binary wavetrains to develop a binary word representative of said waveform in terms of an abstract property thereof, and means for displaying said representative binary word.

6. A signal translation system, comprising a set of filters having selectively alterable transfer functions by which to yield response to signal under observation, means for applying signal to said filters in parallel, means for selectively rendering the response to said signal of each of said filters independent of the response of each of the other filters, means for preselecting a respective set of transfer functions for said set of filters to effect translation of signal therethrough according to an abstract property of the signal, means for adjusting said means for preselecting to alter said transfer functions, and means for synchronizing the operation of said filters, said response rendering means, and said transfer function preselection means over a predetermined time interval.

7. The combination according to claim 6 wherein is further provided means responsive to signal translated by said filters for generating a digital output representative of the amount of signal translation relative to a preselected threshold value.

8. The combination according to claim 7 wherein is further included means responsive to said digital output for display thereof as a means of the identity of said signal in terms of said abstract property.

9. The combination according to claim 6 wherein said response rendering means comprises means for generating orthonormal binary codes, and wherein said transfer function preselection means comprises a recirculating multistage shift register for storing binary digits and for generating pseudorandom binary sequences in accordance therewith, and logic means for synchronously combining said orthonormal binary codes and said pseudo-random binary sequences to form transfer function-selective orthonormal wavetrains for application to said filters.

10. The combination according to claim 9 wherein said logic means comprises gating means for producing the exclusive-OR combination of bits applied thereto.

11. The combination according to claim 9 wherein said adjusting means comprises switch means for selectively loading each stage of said shift register.

12. A system for analyzing signals without regard to rational properties thereof, said system comprising a plurality of abstract property filters coupled for parallel receipt of signal to be analyzed, each of said filters including means for storing voltage derived from said signal, means responsive to binary inputs for selectively gating incoming signal to said storing means, and means for generating a binary digit having a value dependent upon the magnitude of voltage stored relative to preselected reference value during a predetermined time interval; generating means for applying to said gating means of said filters respective orthonormal binary codes for maintaining the response of each of said filters to signal independent of the response of each of the other filters; and means for selectively alterning said codes while maintaining the orthonormality thereof to render each of said filters adaptive to vary the response thereof.

13. The system of claim 12 including means for displaying the binary digits developed by said filters.

References Cited
UNITED STATES PATENTS

| | | | |
|---|---|---|---|
| 3,046,545 | 7/1962 | Westerfield | 340—15.5 |
| 3,167,738 | 1/1965 | Westerfield | 340—15.5 |
| 3,208,065 | 9/1965 | Gutleber et al. | |

EUGENE G. BOTZ, Primary Examiner

U.S. Cl. X.R.

324—77